United States Patent Office 3,780,057
Patented Dec. 18, 1973

3,780,057
PYRAZOLONE PIGMENTS
Christoph Frey, Oberwil, Basel, Switzerland, assignor to
Ciba-Geigy AG
No Drawing. Filed Aug. 19, 1970, Ser. No. 65,332
Claims priority, application Switzerland, Sept. 2, 1969,
13,260/69
Int. Cl. C07d 49/14, 57/00
U.S. Cl. 260—310 A          5 Claims

ABSTRACT OF THE DISCLOSURE

Pyrazolone pigments of the formula

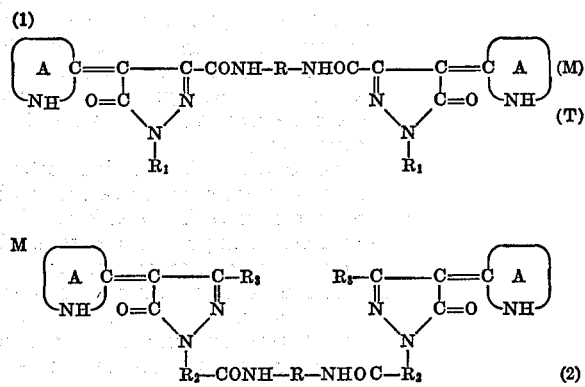

in which A represents a heterocyclic ring fused to at least one benzene ring, R represents a direct bond or an organic residue, $R_1$ represents a hydrogen atom, or an alkyl or aryl group, $R_3$ represents an alkylene or arylene residue and $R_3$ represents an alkyl or carboxylic acid ester group, are valuable pigments coloring plastics and lacquers in fast yellow to red shades.

This invention is based on the observation that new and valuable pyrazolone pigments of the formula

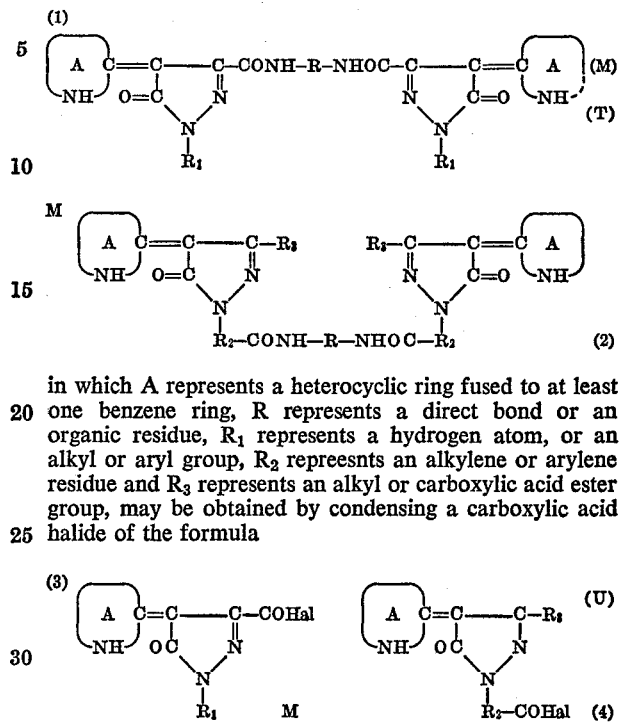

in which A represents a heterocyclic ring fused to at least one benzene ring, R represents a direct bond or an organic residue, $R_1$ represents a hydrogen atom, or an alkyl or aryl group, $R_2$ repreesnts an alkylene or arylene residue and $R_3$ represents an alkyl or carboxylic acid ester group, may be obtained by condensing a carboxylic acid halide of the formula

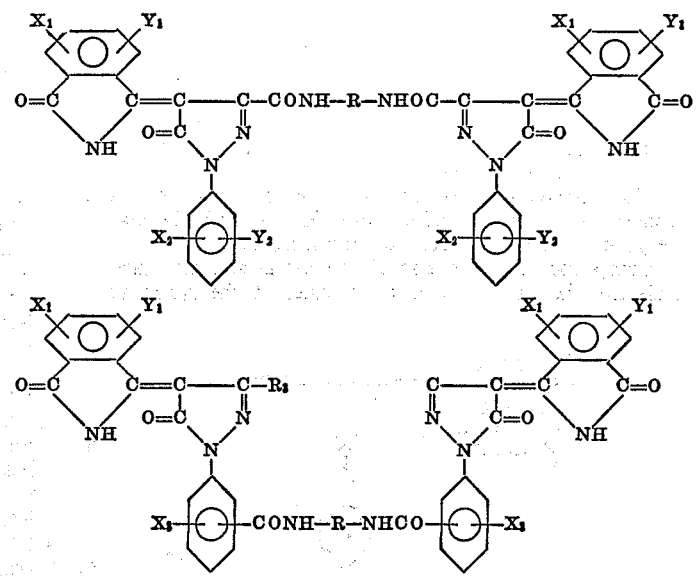

with a diamine in a molar ratio of 2:1.

Since the products of the invention are pigments, they must not contain groups imparting solubility in water, especially acidic groups imparting solubility in water, for example, sulphonic acid or carboxylic acid groups.

Within this class of compounds are included pyrazolone pigments of the formula in which $X_1$ is hydrogen;
$Y_1$ is halogen, nitro or methoxybenzolylamino;
$X_3$ is hydrogen or halogen;
$X_2$ and $Y_2$ each is hydrogen, halogen, lower alkyl, or lower alkylsulphonyl;
$R_3$ is lower alkyl or lower carbalkoxy;
R is

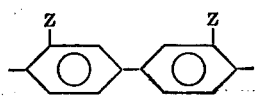

in which X and Y each represents hydrogen, halogen, lower alkyl or lower alkoxy or

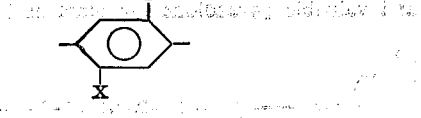

in which X represents hydrogen, halogen, lower alkyl, or lower alkoxy.

The starting materials used are preferably carboxylic acid chlorides of the formulae

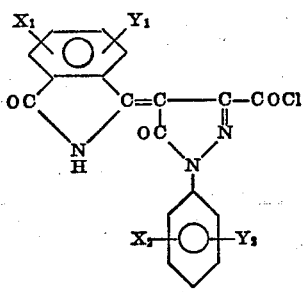

(5) (V)

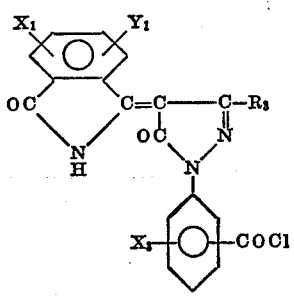

(6) (W)

in which $X_1$, $Y_1$ and $X_3$ each represents a hydrogen or a halogen atom, an alkoxy group, a carboxylic acid amide group or a nitro group, $X_2$ and $Y_2$ each represents a hydrogen or a halogen atom or an alkyl, alkoxy, alkylsulphonyl, nitro or acylamino group and $R_3$ represents an alkyl or a carbalkoxy group.

The carboxylic acids are advantageously obtained by condensing a phthalimidine hydrochloride with the corresponding phenylpyrazolone carboxylic acid.

Compounds that are also of interest as starting materials are the carboxylic acid chlorides of the formulae

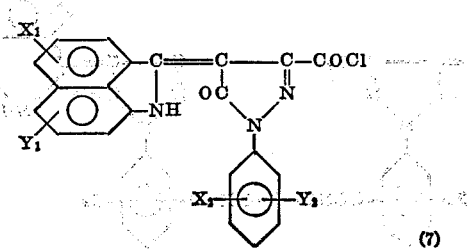

(7)

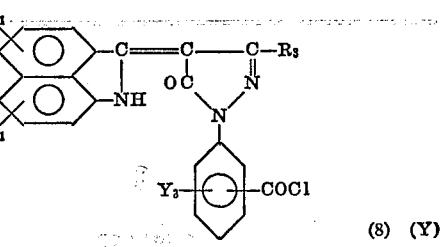

(8) (Y)

in which $X_1$, $Y_1$, $X_2$, $Y_2$, $R_3$ and $X_3$ have the meanings given above.

The corresponding carboxylic acids are advantageously obtained by condensing a compound of the formula

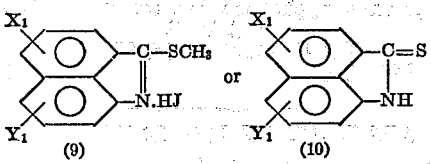

(9)        (10)

with the corresponding phenylpyrazolone carboxylic acid.

The compounds of Formulae 9 and 10 are advantageously obtained by heating naphthostyryl or a nuclear-substituted derivative thereof, for example, 4-chloronaphthostyryl, 2-methoxynaphthostyryl, 5-methoxynaphthostyryl, or 4-bromonaphthostyryl, with phosphorus pentasulphide in pyridine and methylating the resulting thionaphthostyryl with methyl iodide.

Conversion of the carboxylic acids into their halides can be effected in the usual manner by a treatment with acid halogenating agents, especially thionyl chloride. The treatment with the said acid halogenating agents is advantageously carried out in an inert organic solvent, for example, dimethylformamide, a chlorobenzene, for example, monochlorobenzene or dichlorobenzene, toluene, xylene or nitrobenzene. If necessary, dimethylformamide may be used in conjunction with the last five solvents specified.

The diamines to be used in accordance with the invention are, for example, hydrazine or aliphatic diamines, for example, ethylene diamine, heterocyclic diamines, but preferably aromatic diamines and especially those of the benzene, diphenyl or naphthalene series. Specially interesting are the diamines of the formula

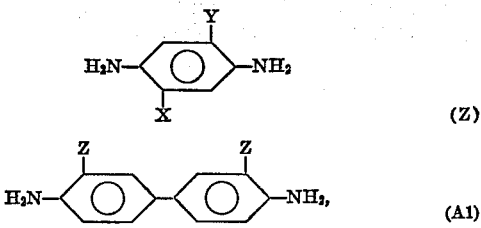

in which X, Y and Z each represents a hydrogen or a halogen atom or an alkyl or alkoxy group.

The following diamines are given as examples:

1,2-diaminobenzene,
1,2-diamino-4-nitrobenzene,
1,3-diaminobenzene,
1,3-diamino-2-methylbenzene,
1,3-diamino-4-methylbenzene,
1,3-diamino-4-chlorobenzene,
1,3-diamino-2,6-dimethylbenzene,
1,3-diamino-4,6-dimethylbenzene,
1,3-diamino-2,5-dichlorobenzene,
1,3-diamino-4,6-dichlorobenzene,
1,3-diamino-4,5,6-trichlorobenzene,
1,3-diamino-5-carbomethoxybenzene,
1,3-diamino-5-carbanilidobenzene,
1,4-diaminobenzene,
1,4-diamino-2-chlorobenzene,
1,4-diamino-2-bromobenzene,
1,4-diamino-2,5-dichlorobenzene, 1,4-diamino-2-methylbenzene,
1,4-diamino-2,5-dimethylbenzene,
1,4-diamino-2-methoxybenzene,
1,4-diamino-2,5-dimethoxybenzene,
1,4-diamino-2,5-diethoxybenzene,
1,4-diamino-2-chloro-5-methylbenzene,
1,4-diamino-2-chloro-5-methoxybenzene,
1,4-diamino-2-methyl-5-methoxybenzene,
4,4'-diaminodiphenyl,
3,3'-dichloro-4,4'-diaminodiphenyl,
3,3'-dimethyl-4,4'-diaminodiphenyl,
3,3'-dimethoxy-4,4'-diaminodiphenyl,
3,3',5,5'-tetrachloro-4,4'-diaminodiphenyl,
2,2'-5,5'-tetrachloro-4,4'-diaminodiphenyl,
3,3'-dichloro-5,5'-dimethyl-4,4'-diaminodiphenyl,
4,4'-diaminodiphenyl ether,
4,4'-diaminodiphenylketone,
4,4'-diaminodiphenylsulphone,
3,3'-diaminodiphenylsulphone,
4,4'-diaminodiphenylmethane,
3,3'-diaminodiphenylmethane,
3,3'-diamino-4,4'-dimethyldiphenylmethane,
3,3'-diamino-4,4'-dichlorobenzyl,
4,4'-diamino-2,5,2',5'-tetrachlorodiphenylurea,
di-(4-aminobenzenesulphonyl)-methylimide,
4-(4'-aminobenzoylamino)-aminobenzene,
4,4'-diaminodiphenylformylamine,
4-aminobenzoic acid-4'-aminophenyl ester,
2,8-diaminochrysene,
3,8-diaminopyrene,
3,10-diaminopyrene,
4,11-diaminofluoroanthene,
2,6- or 1,5-diaminonaphthalene,
2,6-, 1,4- or 1,5-diaminoanthraquinone,
diaminobenzthiazoles, for example, 2-(4'-aminophenyl)-6-aminobenzthiazole,
2,6-diaminopyridine,
2,6-diaminopyrimidine,
3,5-diamino-1-methyl-2,4,6-triazine and
3,3'-diaminodibenzofurane.

Condensation between the carboxylic acid halides defined above and the diamines is advantageously carried out in an anhydrous medium. Under these conditions it generally proceeds surprisingly easily, even at temperatures within the boiling range of the common organic solvents, for example, toluene, monochlorobenzene, dichlorobenzene, trichlorobenzene, nitrobenzene and the like. To accelerate the reaction, it is generally advantageous to use an agent capable of binding acid, for example, anhydrous sodium acetate or pyridine. Some of the products obtained are crystalline and some are amorphous and they are generally obtained in a very good yield and in a pure state. It is expedient first to isolate the acid chlorides obtained from the carboxylic acids. In some cases, however, isolation of the acid chlorides may be omitted without harm and condensation may be carried out immediately after preparation of the carboxylic acid chlorides.

The new products are valuable pigments that can be used for a very wide variety of purposes. For example, they may be used in a finely divided form for the spincoloration of filament and stable-fibre viscose, cellulose ethers and esters, polyamides, polyurethanes and polyesters, and in the production of coloured lacquers and lake-formers, solutions or products made from cellulose acetate, nitrocellulose, natural or synthetic resins, for example, polymerisation resins or condensation resins, for example, aminoplasts, alkyld resins, and phenoplasts, and also polyolefines, for example, polyethylene, polypropylene, polystyrene, polyvinyl chloride, polyacrylonitrile, rubber, casein, silicones and silicone resins. They may also be used advantageously in the manufacture of coloured pencils and laminated sheet material.

The following examples illustrate the invention, the parts and percentages being by weight, unless otherwise stated.

EXAMPLE 1

36 parts of 2-methylmercaptobenzo[c,d]-indolehydroiodide are dissolved in 150 parts of pyridine while stirring. 20.4 parts of 1-phenyl-5-pyrazolone-3-carboxylic acid are added and the batch is heated to 105 to 110° C. It is kept at that temperature for 1½ hours, allowed to cool to 60° C., diluted with 160 parts of methanol and cooled to 15 to 20° C. The dyestuff carboxylic acid that precipitates is isolated by filtration, washed with methanol and water and dried in vacuo at 90 to 100° C.

To prepare the acid chloride, 28 parts of the above acid are stirred into 130 parts of anhydrous ortho-dichlorobenzene and the batch is heated to 90 to 100° C. 13 parts of thionyl chloride are then added dropwise and the batch is heated for 3 hours at 115 to 120° C. The reaction mixture is cooled and filtered, the filter residue is washed with anhydrous benzene and the acid chloride so obtained is dried in vacuo at 60° C.

7.47 parts of the carboxylic acid chloride of the formula

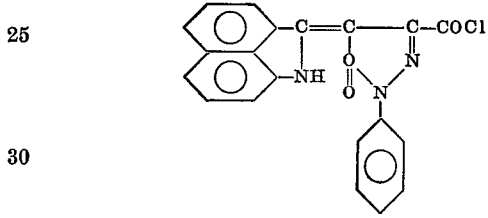

so obtained are heated to 100 to 110° C. in 170 parts of anhydrous ortho-dichlorobenzene and 0.05 part of thionyl chloride. A solution of 2.44 parts of 3,3'-dimethoxy-4,4'-diaminodiphenyl and 0.8 part of pyridine in 50 parts of anhydrous ortho-dichlorobenzene having a temperature of 100 to 110° C. is added and the batch is heated for 12 hours at 140 to 145° C. The batch is allowed to cool to 100° C., filtered, the filter residue is washed with ortho-dichlorobenzene having a temperature of 110 to 130° C. until the washings run colourless, the orthodichlorobenzene is displaced with methanol and water and the pigment obtained is dried in vacuo at 90 to 100° C. A dark red powder is obtained that produces a brownish red film possessing food fastness to migration and light when worked into polyvinyl chloride on a roller mill.

The 2-methylmercaptobenzo[c,d]-indole-hydroiodide specified in the first paragraph above can be prepared in the following manner:

89 parts of naphthostyryl and 60 parts of phosphorus pentasulphide are refluxed for 75 minutes at 110 to 114° C. in 250 parts of anhydrous pyridine. The reaction solution is cooled, poured into 1,250 parts of hot water and kept for one hour at 90 to 95° C. while stirring. The thionaphthostyryl so obtained is allowed to cool, isolated by filtration, washed well with water and then recrystallized in alcohol.

37 parts of thionaphthostyryl and 34 parts of methyl iodide are kept at the boil for 90 minutes in 180 parts of acetone. The batch is cooled, the 2-methylmercaptobenzo [c,d]-indole-hydroiodide is isolated by filtration, washed with a small amount of acetone and then dried in vacuo at 30 to 40° C.

The following table lists components from which further pigments may be obtained by condensing a carbostyryl derivative listed in Column I with a pyrazolone derivative listed in Column II according to the procedure described in the above example, converting the carboxylic acid obtained into the acid chloride, and condensing the acid chloride with a diamine listed in Column III in a molar ratio of 2:1. Column IV indicates the shade produced by the pigment so obtained in polyvinyl chloride.

| I | II | III | IV |
|---|---|---|---|
| 1 | [naphthalene-C(-S-CH₃)=N-HI] | [pyrazolone with COOH, N-o-tolyl] | 1,3-diamino-4-methylbenzene | Reddish brown. |
| 2 | Same as above | Same as above | 1,4-diamino-2,5-dichlorobenzene | Do. |
| 3 | do | do | 3,3'-dichloro-4,4'-diaminodiphenyl | Do. |
| 4 | do | do | 3,3'-dimethoxy-4,4'-diaminodiphenyl | Do. |
| 5 | do | do | 2,6-diaminopyridine | Yellowish brown. |
| 6 | do | [pyrazolone with COOH, N-(2-methyl-4-chlorophenyl)] | 1,4-diaminobenzene | Do. |
| 7 | do | do | 1,4-diamino-2,5-dichlorobenzene | Do. |
| 8 | do | do | 1,3-diamino-4-methylbenzene | Do. |
| 9 | do | do | 3,3'-dichloro-4,4'-diaminodiphenyl | Do. |
| 10 | do | do | 3,3'-dimethoxy-4,4'-diaminodiphenyl | Do. |
| 11 | do | do | 2,6-diaminopyridine | Do. |
| 12 | do | do | 1,4-diamino-2-methoxy-5-chlorobenzene | Brown. |
| 13 | do | [pyrazolone with COOH, N-(2-methylsulfonylphenyl)] | 1,4-diaminobenzene | Claret. |
| 14 | do | Same as above | 1,3-diamino-4-methylbenzene | Red. |
| 15 | do | do | 1,4-diamino-2,5-dichloro-benzene | Do. |
| 16 | do | do | 1,4-diamino-2-methoxy-5-chlorobenzene | Red. |
| 17 | do | do | 3,3'-dichloro-4,4'-diaminodiphenyl | Bluish red. |
| 18 | do | do | 3,3'-dimethoxy-4,4'-diaminodiphenyl | Do. |
| 19 | do | [pyrazolone with COOH, N-(2,4-dichlorophenyl)] | 1,4-diaminobenzene | Brown. |
| 20 | do | do | 1,4-diamino-2,5-dimethylbenzene | Do. |
| 21 | do | do | 1,4-diamino-2,5-dichlorobenzene | Do. |
| 22 | do | do | 1,4-diamino-2,5-dimethoxybenzene | Do. |
| 23 | do | do | 1,3-diamino-4,6-dimethylbenzene | Do. |
| 24 | do | do | 3,3'-dichloro-4,4'-diaminodiphenyl | Do. |
| 25 | do | do | Di-(4-aminobenzenesulphonyl),methylimide | Orange. |
| 26 | do | [pyrazolone with COOH, N-(4-trifluoromethylphenyl)] | 1,3-diamino-4-chlorobenzene | Brown. |
| 27 | do | Same as above | 1,4-diamino-2,5-dichlorobenzene | Do. |
| 28 | do | do | 3,3'-dichloro-4,4'-diaminodiphenyl | Do. |
| 29 | do | do | 3,3'-dimethoxy-4,4'-diaminodiphenyl | Do. |
| 30 | [6-bromonaphthalene-C(-S-CH₃)=N-HI] | [pyrazolone with COOH, N-(4-chlorophenyl)] | 1,3-diamino-4,6-dimethylbenzene | Reddish brown. |

TABLE—Continued

| I | II | III | IV |
|---|---|---|---|
| 31 | Same as Example 30 | Same as Example 30 | 1,4-diamino-2,5-dichlorobenzene | Brown. |
| 32 | [structure: naphthalene-C(S—CH₃)=N·HI] | [structure: pyrazolone with CH₃, Cl-phenyl-COOH] | 1,3-diamino-4,6-dimethylbenzene | Claret. |
| 33 | Same as above | Same as above | 1,5-diamino-napthalene | Do. |
| 34 | do | [structure: pyrazolone with CH₃, Cl-phenyl-COOH] | 1,4-diamino-2,5-dichlorobenzene | Red. |
| 35 | do | Same as above | 1,4-diamino-2,5-dimethoxybenzene | Red. |
| 36 | do | do | 3,3'-dichloro-4,4'-diaminodiphenyl | Red. |
| 37 | do | do | 3,3'-dimethoxy-4,4'-diaminodiphenyl | Red. |
| 38 | do | [structure: pyrazolone with COOH, Cl-phenyl] | do | Orange. |
| 39 | do | Same as above | 2,5-dimethoxy-1,4-diaminobenzene | Reddish orange. |
| 40 | do | do | 2,5-dichloro-1,4-diaminobenzene | Orange. |
| 41 | do | [structure: pyrazolone with COOH, Cl-phenyl] | 3,3'-dichloro-4,4'-diaminodiphenyl | Brown. |
| 42 | do | do | 1,3-diamino-4-methylbenzene | Orange. |
| 43 | do | do | 4,4'-diaminoazobenzene | Orange red. |
| 44 | do | do | 4,4'-diamino-2,2'-dimethylazobenzene | Do. |

EXAMPLE 2

36.5 parts of iminophthalimidine hydrochloride and 41 parts of 1-phenyl-5-pyrazolone-3-carboxylic acid are refluxed for 30 minutes in 500 parts of ethylene glycol monomethyl ether. After cooling, the batch is filtered and the filter residue is washed with methanol and water. The dye stuff carboxylic acid of the formula

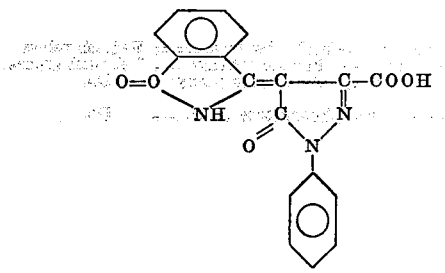

is obtained.

To form the acid chloride, 33.3 parts of the above acid and 0.5 part of dimethylformamide are heated to 90 to 100° C. in 130 parts of anhydrous ortho-dichlorobenzene. 16 parts of thionyl chloride are then added dropwise, and the batch is kept at that temperature for 3 hours while stirring. The batch is cooled to 20° C., filtered, the filter residue is washed with anhydrous benzene and dried in vacuo at 60° C.

7.03 parts of the dyestuff carboxylic acid chloride so obtained are heated to 100 to 110° C. while stirring in 170 parts of anhydrous ortho-dichlorobenzene after the addition of 0.05 part of thionyl chloride. A warm solution of 1.57 parts of 2-methyl-5-chloro-1,4-diaminobenzene in 50 parts of anhydrous ortho-dichlorobenzene is added and the batch is heated for 16 hours at 140 to 145° C. The orange-red pigment that precipitates is isolated by filtration while hot and well washed with hot ortho-dichlorobenzene, methanol and water. It is then dried in vacuo at 100° C., and an orange-red powder is obtained that produces an orange film possessing very good fastness to migration and light when worked into polyvinyl chloride on a roller mill.

The following table lists components from which further pigments may be obtained by condensing a phthalimidine listed in Column I with a pyrozolone listed in Column II according to the procedure described in this example, converting the carboxylic acid so obtained into the acid chloride and condensing the latter with a diamine listed in Column III in a molar ratio of 2:1. The shade produced with the pigment in polyvinyl chloride is indicated in Column IV.

| | I | II | III | IV |
|---|---|---|---|---|
| 1 | phthalimidine·HCl structure | pyrazolone-COOH with phenyl | 4,4'-diamino-3,3'-dimethoxydiphenyl | Orange. |
| 2 | Same as above | Same as above | 4,4'-diamino-3,3'-dichlorodiphenyl | Do. |
| 3 | do | do | 1,4-diamino-2,5-dichlorobenzene | Do. |
| 4 | do | do | 1,4-diamino-2,5-dimethoxybenzene | Brown. |
| 5 | do | do | 1,4-diamino-2,5-diethoxybenzene | Do. |
| 6 | do | do | 2,6-diaminopyridine | Reddish yellow. |
| 7 | do | do | 4,4'-diamono-2,2'-dinitrodiphenyl | Orange. |
| 8 | do | do | 1,5-diaminonathraquinone | Do. |
| 9 | do | do | 2,6-diaminoanthraquinone | Reddish yellow. |
| 10 | do | do | 4,4'-diaminodiphenylsulphone | Orange. |
| 11 | do | do | 3,3'-diaminodiphenylsulphone | Do. |
| 12 | do | do | 4,4'diaminodiphenylether | Yellowish red. |
| 13 | do | do | Mixture of 3,8- and 3,10-diaminopyrene. | Brown. |
| 14 | do | do | 1,3-diamono-4,6-dimethylbenzene | Orange. |
| 15 | do | do | 4,4'-diamino-2,5,2',5'-tetrachlorodiphenylurea, | Do. |
| 16 | do | do | Hydrazine | Do. |
| 17 | do | do | Ethylenediamine | Do. |
| 18 | do | do | 1,4-diaminobenzene | Reddish orange. |
| 19 | do | pyrazolone-CH₃ with Cl-phenyl-COOH | do | Yellow. |
| 20 | do | Same as above | 1,4-diamino-2,5-dichlorobenzene | Do. |
| 21 | do | do | 1,3-diamino-4,6-dimethylbenzene | Do. |
| 22 | do | do | 1,5-diaminonaphthalene | Do. |
| 23 | do | do | 3,3'-dimethoxy-4,4'-diaminodiphenyl | Do. |
| 24 | do | pyrazolone-COOH with CH₃-phenyl | 1,3-diamino-4,6-dimethylbenzene | Red. |
| 25 | do | Same as above | 3,3'-dichloro-4.4'-diaminodiphenyl | Orange. |
| 26 | do | do | 3,3'-dimethoxy-4,4'-diaminodiphenyl | Brown. |
| 27 | do | pyrazolone-COOC₂H₅ with phenyl-COOH | 1,3-diamino-4-chlorobenzene | Yellow. |
| 28 | do | Same as above | 1,4-diamino-2,5-dichlorobenzene | Reddish yellow. |
| 29 | do | do | 3,3'-dichloro-4,4'-diaminodiphenyl | Yellowish orange. |
| 30 | do | do | 3,3'-dimethoxy-4,4'-diaminodiphenyl | Do. |
| 31 | do | pyrazolone-COOH with CF₃-phenyl | 1,3-diamino-4-chlorobenzene | Do. |

TABLE—Continued

| I | II | III | IV |
|---|---|---|---|
| 32 | Same as Example 1 | Same as Example 31 | 1,4-diamino-2,5-dichlorobenzene | Do. |
| 33 | do | do | 3,3'-dichloro-4,4'-diaminodiphenyl | Yellow. |
| 34 | do | do | 3,3'-dimethoxy-4,4'-diaminodiphenyl | Orange. |
| 35 | do | [pyrazolone with 2-chlorophenyl, COOH] | 1,4-diamino-2-methyl-5-chlorobenzene | Yellow. |
| 36 | do | Same as above | 1,4-diamino-2,5-dimethoxybenzene | Brown. |
| 37 | do | do | 3,3'-dichloro-4,4'-diaminodiphenyl | Yellow. |
| 38 | do | do | 3,3'-dimethoxy-4,4'-diaminodiphenyl | Do. |
| 39 | do | [pyrazolone with 2-methoxyphenyl, COOH] | 1,4-diamino-2,5-dichlorobenzene | Do. |
| 40 | do | Same as above | 1,4-diamino-2,5-dimethoxybenzene | Brown. |
| 41 | do | do | 1,4-diamino-2-methyl-5-chlorobenzene | Yellow. |
| 42 | do | do | 3,3'-dichloro-4,4'-diaminodiphenyl | Do. |
| 43 | do | do | 1,5-diaminonaphthalene | Brown. |
| 44 | do | [pyrazolone with 4-COOH-phenyl, CH₃] | 1,4-diamino-2,5-dichlorobenzene | Yellowish brown. |
| 45 | do | Same as above | 4,4'-diaminodiphenyl | Yellow. |
| 46 | do | do | 3,3'-dimethoxy-4,4'-diaminodiphenyl | Do. |
| 47 | do | do | 1,2-diaminobenzene | Do. |
| 48 | do | do | 1,5-diaminoanthraquinone | Do. |
| 49 | do | [pyrazolone with 2-methyl-4-chlorophenyl, COOH] | 1,3-diamino-4-methylbenzene | Do. |
| 50 | do | Same as above | 1,4-diamino-2,5-dichlorobenzene | Do. |
| 51 | do | do | 1,4-diamino-2-methoxy-5-chlorobenzene | Do. |
| 52 | do | do | 3,3'-dichloro-4,4'-diaminodiphenyl | Do. |
| 53 | [5-bromo-isoindolinone derivative, C=NH·HCl] | [pyrazolone with phenyl, COOH] | 3,3'-dichloro-4,4'-diaminodiphenyl | Reddish brown. |
| 54 | Same as above | Same as above | 3,3'-dimethoxy-4,4'-diaminodiphenyl | Do. |
| 55 | do | [pyrazolone with 4-chlorophenyl, COOH] | 1,4-diamino-2,5-dichlorobenzene | Red. |

TABLE—Continued

| I | II | III | IV |
|---|---|---|---|
| 56 | 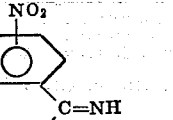 (NO2 substituted structure with OC, C=NH, NH, .HCl) | 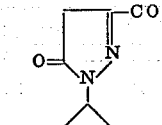 (COOH-pyrazolone with phenyl) | 3,3'-dichloro-4,4'-diaminodiphenyl | Brown. |
| 57 | 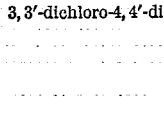 (CH3O—phenyl—NH—CO— structure with OC, C=NH, NH, .HCl) | ...do... | 1,4-diamino-2,5-dichlorobenzene | Brown. |
| 58 | Same as above | ...do... | 3,3'-dimethoxy-4,4'-diaminodiphenyl | Do. |

EXAMPLE 3

18.5 parts of the 2-mercaptobenzo-[c,d]-indole of the formula

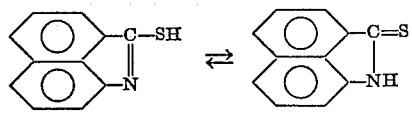

and 25.8 parts of 1-(2'-chloro-5'-carboxyphenyl)-3-methyl-5-pyrazolone are heated for 2 hours at 170 to 175° C. in 100 parts of nitrobenzene while stirring. After cooling the reaction mixture, the dyestuff of the formula

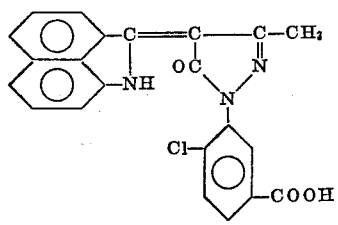

is isolated by filtration, well washed with methanol and water and then dried in vacuo at 100° C.

The carboxylic acid is converted into the acid chloride in the manner described in Example 1 and then condensed with 1,3-diamino-4,6-dimethylbenzene. The pigment so obtained is identical with pigment No. 32 in the table in Example 1.

Pigment No. 33 in the table in Example 1 can be prepared in the same manner.

EXAMPLE 4

A mixture is prepared from 65 parts of polyvinyl chloride, 35 parts of dioctyl phthalate and 0.2 part of the pigment obtained in accordance with the first three paragraphs of Example 1 and then worked to and fro for 7 minutes at 140° C. on a two-roller mill. A brownish red film possessing very good fastness to light and migration is obtained.

EXAMPLE 5

0.25 part of the pigment obtained in accordance with the first three paragraphs of Example 1, 40 parts of an alkyd-melamine stoving lacquer having a solids content of 50%, and 4.75 parts of titanium dioxide are ground in a rod mill for 24 hours. A thin coating of the lacquer is applied to aluminium foil and stoved for one hour at 120° C. A brownish red coating possessing excellent fastness to light is obtained.

EXAMPLE 6

100 parts of polyethylene terephthalate chips are mixed with 1 part of the pigment obtained in accordance with the first three paragraphs of Example 1. The chips are then spun into filaments at about 270° C. in the usual manner. The polyester filaments so obtained are coloured reddish brown and possess good properties of fastness.

EXAMPLE 7

100 parts of a caprolactam polyamide in the form of chips are mixed with 1 part of the pigment No. 18 in the table in Example 2 in a mixing drum. The chips are then spun into filaments by the melt-spinning process customarily used for polyamides. The reddish orange polyamide fibres so obtained possess very good fastness to light.

I claim:

1. A pyrazolone pigment of the formula

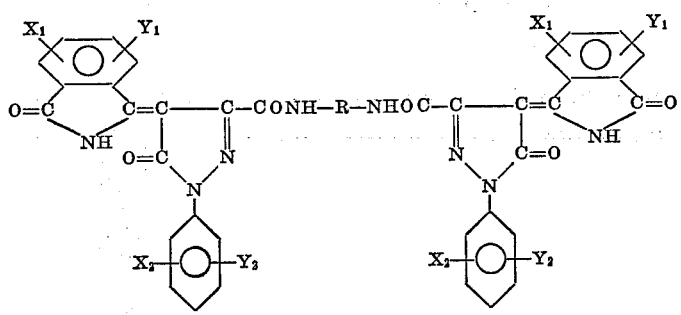

or

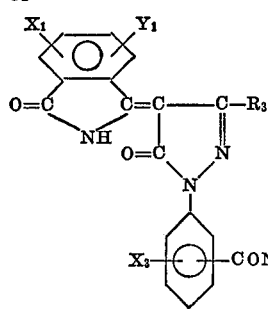 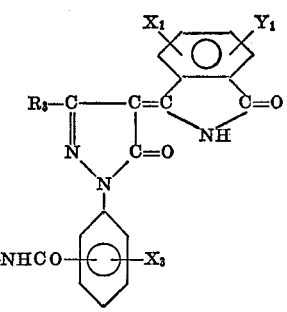

in which
X₁ is hydrogen;
Y₁ is halogen, nitro or methoxybenzoylamino;
X₃ is hydrogen or halogen;
X₂ and Y₂ each is hydrogen, halogen, lower alkyl, or lower alkylsulphonyl;
R₃ is lower alkyl or lower carbalkoxy;
R is

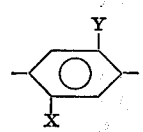

in which X and Y each represents hydrogen, halogen, lower alkyl or lower alkoxy or

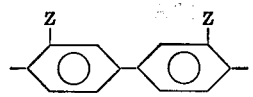

in which Z represents hydrogen, halogen, lower alkyl, or lower alkoxy.

2. A pyrazolone pigment of the formula

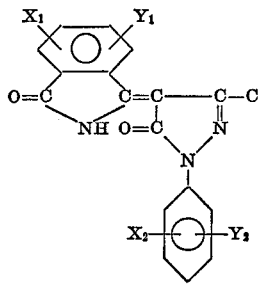

in which
X₁ is hydrogen;
Y₁ is halogen, nitro or methoxybenzoylamino;
X₂ and Y₂ each is hydrogen, halogen, lower alkyl, lower alkoxy, lower alkylsulphonyl, nitro or lower alkanoylamino;
R is

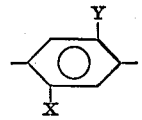

in which X and Y each represents hydrogen, halogen, lower alkyl, or lower alkoxy or

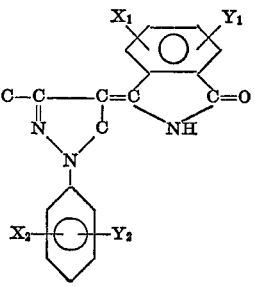

in which Z represents hydrogen, halogen, lower alkyl, or lower alkoxy.

3. The compound of claim 1 of the formula

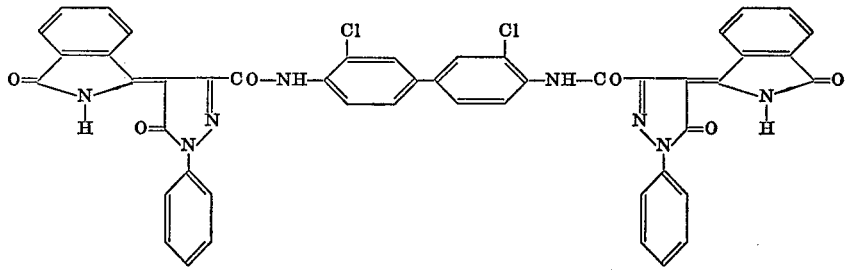

4. The compound of claim 1 of the formula

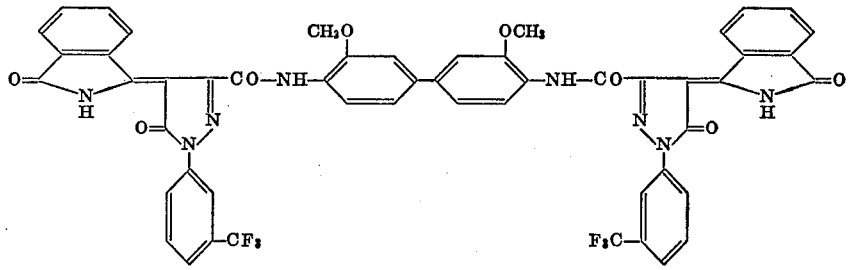

5. The compound as claimed in claim 1 of the formula
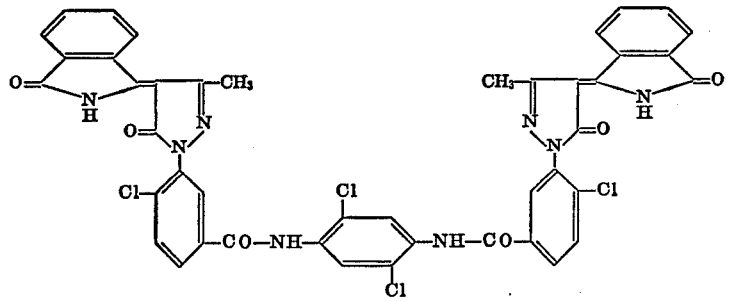
References Cited
UNITED STATES PATENTS
| | | | |
|---|---|---|---|
| 1,991,313 | 2/1935 | Bonhote et al. | 260—310 A |
| 1,999,438 | 4/1935 | Bonhote et al. | 260—310 A |
| 2,254,354 | 9/1941 | Davies | 260—310 A |
| 2,589,004 | 3/1952 | Weissberger et al. | 260—310 A |
FOREIGN PATENTS
| | | | |
|---|---|---|---|
| 159,665 | 4/1933 | Switzerland | 260—310 A |
| 161,739 | 7/1933 | Switzerland | 260—310 A |
| 161,740 | 7/1933 | Switzerland | 260—310 A |
| 161,741 | 8/1933 | Switzerland | 260—310 A |
| 161,742 | 8/1933 | Switzerland | 260—310 A |
| 161,743 | 8/1933 | Switzerland | 260—310 A |
NATALIE TROUSOF, Primary Examiner
U.S. Cl. X.R.
8—54.2, 162 R, 162 S, 172, 178 R, 178 E, 179; 106—148, 165, 193 D, 193 P; 260—37 SB, 37 N, 37 P, 38, 39 P, 40 R, 41 C, 326.9, 571, 575, 762